(12) United States Patent
Kimball et al.

(10) Patent No.: US 7,681,090 B2
(45) Date of Patent: Mar. 16, 2010

(54) RIPPLE CORRELATION CONTROL BASED ON LIMITED SAMPLING

(75) Inventors: Jonathan W. Kimball, Mahomet, IL (US); Philip T. Krein, Champaign, IL (US)

(73) Assignee: SolarBridge Technologies, Inc., Champaign, IL (US)

( * ) Notice: Subject to any disclaimer, the term of this patent is extended or adjusted under 35 U.S.C. 154(b) by 364 days.

(21) Appl. No.: 11/626,911

(22) Filed: Jan. 25, 2007

(65) Prior Publication Data

US 2008/0183338 A1 Jul. 31, 2008

(51) Int. Cl.
*G06K 5/04* (2006.01)
*G06F 1/00* (2006.01)
(52) U.S. Cl. ...................... 714/700; 323/222
(58) Field of Classification Search ............... 714/700, 714/699, 701, 709, 740, 799, 22; 323/222, 323/282
See application file for complete search history.

(56) References Cited

U.S. PATENT DOCUMENTS

| | | | | |
|---|---|---|---|---|
| 5,764,039 A | * | 6/1998 | Choi et al. | 323/222 |
| 5,801,519 A | * | 9/1998 | Midya et al. | 323/222 |
| 6,157,177 A | * | 12/2000 | Feldtkeller | 323/267 |
| 2005/0162144 A1 | * | 7/2005 | Kernahan | 323/300 |
| 2005/0168198 A1 | * | 8/2005 | Maksimovic et al. | 323/222 |
| 2005/0286277 A1 | * | 12/2005 | Krein | 363/65 |

* cited by examiner

*Primary Examiner*—Phung M Chung
(74) *Attorney, Agent, or Firm*—Barnes & Thornburg LLP

(57) ABSTRACT

A method for controlling a variable of a switching electrical circuit detects values for each of a first waveform and of a second waveform in the switching circuit at a beginning of and at a predetermined instant during a switching interval of a switching operation of the electrical circuit, both of the first and second waveforms are perturbed by the switching operation, and evaluates the variable based on the corresponding values of both the first waveform and the second waveform detected at the beginning and at the predetermined instant during the switching interval. The method further adjusts an operating point of the circuit based on a change in the variable between the two evaluations so as to maximize the variable.

25 Claims, 7 Drawing Sheets

RIPPLE CORRELATION CONTROL BASED ON LIMITED SAMPLING

FIELD

The invention relates, generally, to electronic control circuits and, more particularly, to ripple correlation control of switching systems based on a limited or low sampling rate.

BACKGROUND

Most power sources and loads are nonlinear systems and have an optimum operating point. The online identification of the optimum operating point and the development of a corresponding control system which enables the nonlinear system to robustly operate at such a point constitute an important challenge. In the design of these control systems that desirably maintain these corresponding nonlinear systems operating at or near their optimum operating point, power electronics circuits and systems have been implemented. Typically, power electronic circuits and systems manipulate energy flows of power sources and loads with switches. Consequently, switching power converters are also nonlinear large-signal systems.

Switching actions produce ripple, which cannot be avoided without a power loss penalty. In many power converters and their controls, ripple is at best a substitute for a switching control (as in hysteresis control) and at worst a nuisance and a source of noise and interference. Ripple has typically not been considered as a source of information, and numerous techniques have been configured to minimize ripple and discontinuities of switching by smoothing out the switch actions and averaging through filters.

However, ripple which is inherent to the switching actions and represents a consistent perturbation signal has been found to be a source of information and a basis for control. Research results have shown that significant control objectives, such as cost-function optimization, can be addressed with a ripple correlation technique. Ripple correlation control (RCC) has opened a whole suite of new possibilities for converter action and for control loops. Further, power electronics are uniquely suited for this approach because of their self-perturbed internal switching action.

RCC is a nonlinear control approach applicable to power electronic circuits, which makes use of voltage, current, or power ripple and correlates the ripple with switching functions to effect control, as disclosed in U.S. Pat. No. 5,801,519. RCC has been shown to directly support cost-function minimization and maximization, and can be applied, for example, to dynamic power optimization. RCC has also been applied to adaptive dead time adjustment, solar power processing, and motor power minimization. Typical applications have included active maximization of converter efficiency and other nonlinear functions.

Among these typical applications figure solar panels, which can deliver maximum power at a particular voltage and current point that varies with the temperature and illumination affecting the solar panels. Since 1968, researchers have been developing different maximum power point tracker (MPPT) methods to operate solar panels at their maximum operating points or levels. Energy processing for solar panels is generally done with modern power electronics, because switching power converters as designed for power electronics applications offer high efficiency and are readily controlled. Nearly all recent work on MPPT approaches involves power electronics to implement the solutions.

Tracking the maximum power point is extremely important for solar applications. While the price of solar panels has dropped dramatically over the past 30 years, solar panel size and cost are dominant factors in a solar installation. In the most basic installations, solar panels are connected directly to a battery through a diode, which forces the panels to operate at a voltage that follows the battery characteristics, not the panel characteristics, and does not deliver maximum power. More sophisticated applications use a switching power converter to interface between the solar panel and the load. When a switching power converter is present, RCC represents a minor addition to the converter control to achieve tracking of the panel maximum power with minimal extra cost. Moreover, while RCC is a general method for optimization method, its application to the solar MPPT problem is well established. For example, the power ripple is correlated with the voltage ripple to build an MPPT for a solar panel.

RCC has previously been cast as a continuous-time technique, implemented with analog circuits. In the analog environment, RCC was implemented by utilizing a continuous signal processing of the systems being controlled. However, the continuous-time technique of the RCC typically requires that the controller operates with a substantially high volume of information and a correspondingly high sampling rate, which may be problematic. Further, many applications can benefit from an RCC technique that provides reduced quiescent power and mode-switching.

Therefore, a need exists for a ripple correlation control that operates a switching power converter at optimum conditions with a low sampling rate that overcomes the problems noted above and others previously experienced for addressing issues of volume of information, reduced quiescent power or mode-switching. These and other needs will become apparent to those of skill in the art after reading the present specification.

SUMMARY

The foregoing problems are solved and a technical advance is achieved by the present invention. Articles of manufacture and systems consistent with the present invention provide a a ripple correlation control that operates a switching power converter at optimum conditions with a low sampling rate.

A method for controlling a variable of a switching electrical circuit detects values for each of a first waveform and of a second waveform in the switching circuit at a beginning of and at a predetermined instant during a switching interval of a switching operation of the electrical circuit, both of the first and second waveforms are perturbed by the switching operation, and evaluates the variable based on the corresponding values of both the first waveform and the second waveform detected at the beginning and at the predetermined instant during the switching interval. The method further adjusts an operating point of the circuit based on a change in the variable between the two evaluations so as to minimize the change in the variable.

Articles of manufacture consistent with the present invention also provide a method for controlling an input power to a switching dc-dc converter. The method senses a first ripple on an input voltage to the converter; the first ripple is produced by a switching operation of the converter, and detects values of the input voltage at a beginning of and at a predetermined instant during a switching interval of the switching operation of the electrical circuit. The method also senses a second ripple on an input current to the converter; the second ripple is produced by the switching operation of the converter, and detects values of the input current at the beginning of and at the predetermined instant during the switching interval. Further, the method evaluates the input power based on the corresponding values of both the input voltage and the input current detected at the beginning and at the predetermined instant during the switching interval, and varies a duty ratio of the switching operation based on a change in the input power so as to minimize the change in the variable.

Other systems, apparatus, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE DRAWINGS

Reference will now be made in detail to an implementation consistent with the present invention as illustrated in the accompanying drawings. Wherever possible, the same reference numbers will be used throughout the drawings and the following description to refer to the same or like parts.

Figure 1:
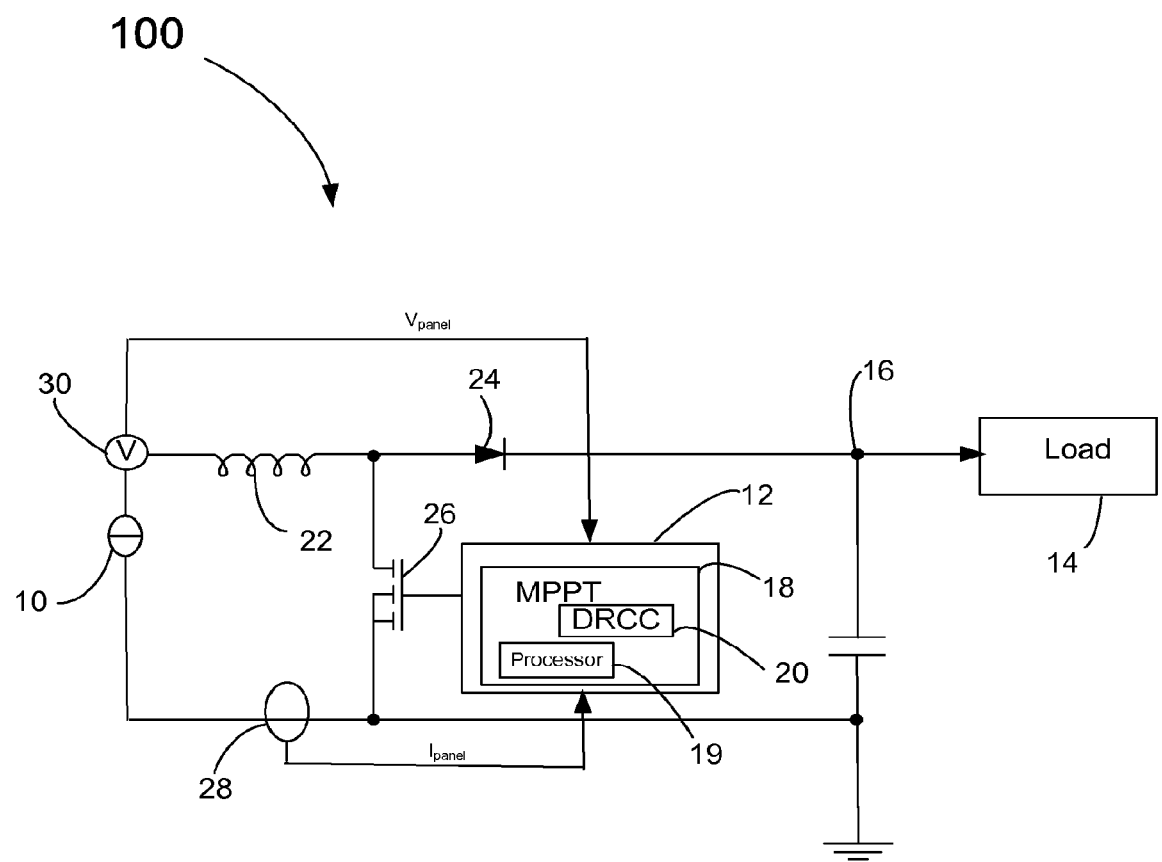
FIG. 1 is a schematic diagram illustrating an embodiment of a power supply system that incorporates a boost converter for solar panel interface consistent with the present invention.

FIG. 1 depicts one embodiment of a power supply system or apparatus 100 consistent with the present invention. The power supply apparatus 100 is a modular system that comprises an energy source or recharge unit 10 suitable for long-term operation and expected to provide variable energy, a switching power conversion circuit or source converter 12 that draws power when activated from the energy source unit 10 in a manner that addresses the needs of a load 14.

The energy source unit 10 may be any kind of power or energy generating system, such as for example a solar panel, solar cell, fuel cell, wind generator, rotary generator, etc. For the purposes of the present invention, the energy source unit 10 is a solar panel. One advantageous feature is that the energy source unit 10 may be configured to be controlled to maximize its performance and longevity. In the case of a solar or wind source unit, the control draws maximum available power whenever power is available and useful. In the case of a fuel cell or rotary generator, the control acts to maintain operation at an optimum power point, selected for the specific technology. One exemplary application may be an unattended long-term power supply, so those energy systems that require substantially no maintenance are most suitable. These would include solar photovoltaic panels, wind generators, small water wheels, or devices able to extract energy from the immediate surroundings. Almost all plausible energy source units 10 for this purpose have an identified optimum operating condition. As such, the energy source unit 10 uses a switching power converter controlled to enforce this optimum. This is intended to make the operation of the energy source unit 10 nearly independent from those of the load 14.

The load 14 can be any kind of electric load, which requires electric power at a rate or magnitude that does not exceed the capacities of the energy source unit 10 over time, or for which periods of nonuse during shortages of such capacities can be tolerated before the energy source unit 10 is re-energized and self-started. The energy source unit 10 needs to be suitable for the load 14 that may require either fairly steady or intermittent current.

Now referring back to FIG. 1, the energy source unit 10 is connected to the source converter 12 such that energy or power generated or otherwise produced by the energy source unit 10 flows through the source converter 12 to the load 14 via the node 16. The source converter 12 is a dc-dc switching power converter, and preferably a boost type dc-dc converter. A boost converter is preferable because a continuous inductor current is drawn from the solar panel without additional filtering. The source converter 12 incorporates a maximum power point tracker (MPPT) 18, i.e., an operating point generator, which serves to insure that the energy source 10 generates maximum power without regard to voltage at node 16 or other conditions. When the energy source unit 10 is a solar panel, the source converter 12 (and its MPPT controller 18) functions only when solar energy is available, such as during daylight hours. That is, an internal processor 19 of the source converter 12 does not consume energy unless the energy source unit 10 is energized. This operational feature of the source converter 12 is accomplished by supplying the source converter controls from the panel of the energy source unit 10.

Still referring to FIG. 1, the power supply apparatus 100 includes protection elements consistent with the present invention. As shown, an inductor element 22 connected at the output of the energy source unit 10, a unidirectional element 24, such as a diode, connected in series between the inductor element 22 and the load 14, and a switching element S26 connected in parallel with the energy source unit 10 and the inductor 22. The unidirectional element 24 may be a field-effect transistor (FET) or metal-oxide semiconductor FET (MOSFET). The switching element S26 is coupled for switching operations to the source converter 12. Further, a current sensor 28 and a voltage sensor 30 are configured to detect and to supply corresponding values of a current $i_{panel}(t)$ and of a voltage $v_{panel}(t)$ of the energy source unit 10 to the source converter 12, which serves as an evaluating unit of the detected values.

The MPPT 18 is a switching power converter that exposes the energy source unit 10 to low-level ripple. The ripple can be considered a dynamic perturbation and is used to obtain maximum power tracking in a photovoltaic application, for example. No extra perturbation is needed, so the ripple correlation control (RCC) technique keeps converter operation at the optimum point. Ripple measurement allows tracking on a time scale of only a few switching periods.

Still referring to FIG. 1, the MPPT 18 includes a power section comprised of the inductor 22, MOSFET 26 and diode 24 which accomplishes the power transfer and a control section or power controller 20 which incorporates a digital RCC (DRCC, to be explained in detail later) to continuously adjust the power section in order to optimize the power point at which the circuitry operates. Physically, the power section is a power converter, which is a network of switches and passive storage elements (inductors, capacitors and transformers). The passive elements store energy in order to smooth the power transfer without loss. The power controller 20 will be hereafter referred to as DRCC controller 20.

Typical boost converters include a capacitor and a switch connected in parallel with a source, an inductor connected between the source and the switch and a diode connected between the switch and the capacitor. When the switch is turned on, the inductor stores energy from the source. When the switch is turned off, this energy is fed to the load and the output capacitor through the diode. The energy stored in the capacitor provides the load power when the switch is turned on. As such, the output voltage obtained is higher than the input voltage by a factor of $1/(1-D)$, where D is the duty ratio of the switch.

By incorporating the DRCC controller 20, the source converter 12 becomes a variable dc-dc converter that uses a digital ripple correlation control algorithm to force the terminals of the photovoltaic panel to an impedance that produces the maximum power out of the panel of the energy source unit 10. The DRCC 20 is configured to adjust the panel operating point to extract maximum power on a moment-by-moment basis. The DRCC controller 20 may act entirely based on panel terminal characteristics so as to function irrespectively of the voltage at node 16. As such, the source converter 12 does not disrupt voltage level or interfere with voltage regulation action elsewhere in the power supply apparatus 100.

The DRCC controller 20 may also be configured to enforce a voltage limit and permit an external digital command to shut it down. Without such a limit or command, excess solar power may continue to be delivered from the energy source unit 10 even when the load 14 is light. In this situation, solar energy is not needed, and there is a potential for delivering excessive voltage at the output node 16. Moreover, when the produced energy falls below a predetermined energy level, the DRCC controller 20 may deactivate the source converter 12. Power tracking subject to a voltage limit and shutdown command is a known practice.

As the DRCC controller 20 is utilized in tracking an optimum operating power point, then an analysis of RCC can follow along the lines of classical optimal control theory. Generally, a converter has internal states X(t), representing a vector of voltage and current state variables x(t) that define the operation. Consider that the power converter 12 is switching at a fixed frequency $$f_{sw} = \frac{1}{T},$$

where T represents the length of a switching interval. Let us define a cost function J(x) that is to be optimized (maximized or minimized). For example, to functionally build an RCC controller for solar power, the cost function J(x) is defined as $J(x)=P_{panel}(t)$, where $P_{panel}(t)$ represents the power coming from the energy source unit 10 solar panel. Next, an individual variable z(t) is selected from among the states within the power converter 12 that has ripple at $f_{sw}$ and affects J. z(t) is configured as control variable altered by switch action that influences J In a solar application, the variable z(t) can be the panel current $i_{panel}(t)$ or the panel voltage $v_{panel}(t)$. By definition, an extremum of J is located where:

$$\frac{\partial J}{\partial z} = 0. \qquad \text{Equation 1}$$

To drive a function to zero, integral control is often used to generate an input command u(t) such that:

$$u(t) = k \int \frac{\partial J}{\partial z} dt \qquad \text{Equation 2}$$

Unfortunately, $$\frac{\partial J}{\partial z}$$

is usually not measurable directly. However, it is permissible to multiply the integrand by any positive definite function. This may change the convergence rate but will not alter the equilibrium. A convenient choice is $$\left(\frac{dz}{dt}\right)^2,$$

which will be positive (except at isolated points in time) if the converter is switching. Then Equation 2 augmented with $$\left(\frac{dz}{dt}\right)^2,$$

becomes $$u = k \int \frac{\partial J}{\partial z} \frac{dz}{dt} \frac{dz}{dt} dt = k \int \frac{dJ}{dt} \frac{dz}{dt} dt = k \int \dot{J}\dot{z} dt. \qquad \text{Equation 3}$$

Now the unknown partial derivative $$\frac{\partial J}{\partial z}$$

has been replaced with a product of total time derivatives $\dot{J}=dJ/dt$ and $\dot{z}=dz/dt$, which are likely to be measurable. Equation 3 is tractable and can be used for control, although time derivative computations tend to add noise and may not be preferred. As such, a variety of simplifications has been proposed. For example, the derivatives of variables can be replaced with high-pass filters, as long as both filters have similar spectral characteristics. Simpler systems make use of the sign of $\dot{z}$. In some cases, the sign of $\dot{z}$ is directly related to a switching function, so $\dot{z}$ need not be computed. These simplifications affect the convergence rate but not the equilibrium point.

There are two basic limitations on the use of RCC. First, like many optimization algorithms, RCC finds a local extremum. This is not a problem for a single solar cell, but can be a challenge for complicated interconnected panels. Limits can be enforced to ensure that the local extremum is in fact the global extremum. In many cases, this is a simple task that can be enforced with limits on the input command u(t). Second, RCC can make use of phase information, so any unmodeled dynamics that alter the phases of signals will enter into J or z and could interfere with the action of the MPPT 18. Limitations owing to unmodeled dynamics often drive design decisions, such as the choice of z or $f_{sw}$.

Beyond these basic limitations, there is a significant barrier to implementing RCC in an analog circuit. Equation 3 includes at least one multiplication. While analog multipliers exist, they are not common and tend to be relatively expensive and power hungry compared to more common analog circuits. If $\text{sgn}(\dot{z})$ is used in place of the derivative, one multiplication can be replaced with a synchronous demodulator. This is a significant advantage, since synchronous demodulators are common and inexpensive. In solar power applications, computation of J usually involves a second multiplication. For example, the solar panel power $P_{panel}$ is the product of $v_{panel}(t)$ and $i_{panel}(t)$. This step is less suited for a synchronous demodulator, so the drawbacks of analog multipliers remain. If these two limitations can be overcome, RCC provides excellent power tracking.

Many of the limitations of the continuous-time RCC can be minimized if the controller were implemented digitally. For example, mode-switching can be used to ensure operation near a global extreme. Microcontrollers with hardware multipliers are available at a variety of price points. An obvious implementation is to sample all of the signals necessary to compute J and z at a high sampling rate and implement Equation 3 directly. Further, the problematic high sampling can be mitigated by determining signals that can be sampled at a modest frequency such as $f_{sw}$ or $2f_{sw}$ then used in a digital computation to provide a useful approximation of Equation 3.

To develop this alternative approach, the internal state variable z(t) that represents a voltage or current within the switching power converter 12 is utilized. Let us assume that the time derivative $\dot{z}(t)$ does not change sign more than once per period. In a typical dc-dc power converter, a change in sign of the time derivative is governed by switch action and therefore occurs once per switching cycle. As such, a time fraction when $\dot{z}>0$, denoted as D, is determined and the time reference t is set at 0 at a moment when $\dot{z}$ becomes positive. Define $$Q \triangleq \int_0^T \dot{J}z\,dt \quad \text{Equation 4}$$

such that Q is the integral in Equation 3 evaluated over a single switching interval of length T. Many signals in switching converters have $\dot{z}$ that is piecewise constant. This is true, for example, of the inductor current in a buck converter or the capacitor voltage in a boost converter. In this case, the analysis can be simplified. For the derivative, define $$\dot{z} = \begin{cases} w_+ & \text{mod}(t, T) \in [0, DT) \\ w_- & \text{mod}(t, T) \in [DT, T) \end{cases} \quad \text{Equation 5}$$

By substituting $\dot{z}$ of Equation 5 in Equation 4, the expression for Q can be simplified to $$Q = w_+ \int_0^{DT} \dot{J}\,dt + w_- \int_{DT}^{T} \dot{J}\,dt \quad \text{Equation 6}$$

$$Q = w_+(J(DT)-J(0)) + w_-(J(T)-J(DT))$$

Since in periodic steady states, when the desired optimum point has been reached, J and z do not change on average from one cycle to the next, the result is $$J(0)=J(T)$$

$$w_+D+w_-(1-D)=0 \quad \text{Equation 7}$$

Again substituting and simplifying, the resulting expression for Q is $$Q = \frac{w_+}{1-D}(J(DT)-J(0)) \quad \text{Equation 8}$$

As such, a simplified process with reduced sampling requirements follows directly from Equation 8:

1. sample the variables that affect J at the beginning of the interval T and at the instant when $\dot{z}$ changes sign;
2. compute J from the sampled variables; and
3. adjust u based on the change in J between samples.

Thus, the input command u can be updated once each period based on two samples of the variables or twice each period if samples are taken during both intervals: once at (or just after) the beginning of the period, once in the middle (at DT) and once at (or just before) the end of the period. In order to reduce computational and sampling burdens, the input command u can be held constant for some time $nT_{sw}$ after which the controller samples and evaluates J.

To further reduce computations, simplifications can be made. For example, the leading term $$\frac{w_+}{1-D}$$

of Equation 8 can be replaced with a constant k.

Moreover, the sign of the difference (J(DT)−J(0)) can be used instead of the actual difference, which can represent a delta modulation. Then in the simplest form, the result is $$u(T)=u(0)+k\,\mathrm{sgn}(J(DT)-J(0))\qquad\text{Equation 9}$$

Figure 8:
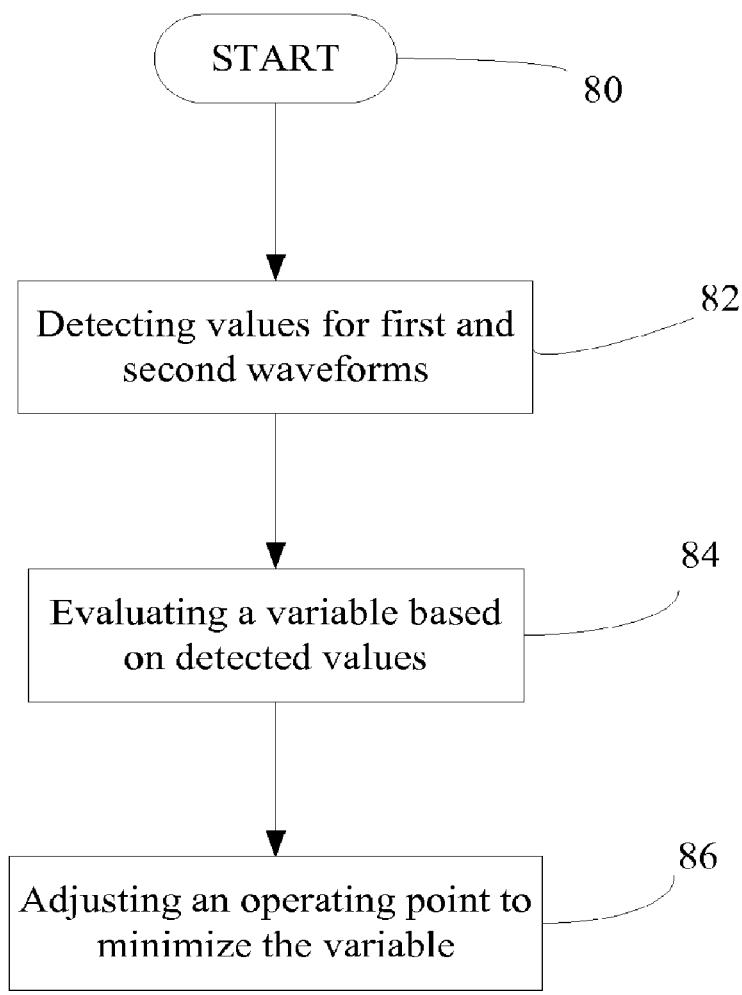
FIG. 8 is a flow diagram illustrating a method for minimizing a variable based on detected values of waveforms consistent with the present invention.

This process continues to change the control or input command u(t) until J(DT)=J(0), which would indicate that the cost function J is no longer changing on average and an optimum has been reached. Further, J is the same at the beginning, middle, and end of the switching interval T and is at an extremum. This process is illustrated by Steps 80-86 of FIG. 8.

It is important to notice that the special times 0 and DT are not unique. Samples taken at somewhat different intervals such as $0+\Delta t$ and $DT+\Delta t$ can also be used to achieve the same result. Off-nominal times at worst will drive operation only slightly away from the desired optimum, since ripple should not be large and the possible error in this case does not exceed the ripple level. In addition, while periodic operation is typical, for this control, interval T need not be constant. It is only necessary to be able to determine T as the converter operates.

While RCC has been successfully used in solar MPPTs, a digital version of an RCC (DRCC) may be advantageous. Any converter that presents a constant output current to the panel terminals may be used. A convenient choice can be a boost converter 12, as shown in FIG. 1. Define $$J(x)=P_{panel}(t)=i_{panel}(t)v_{panel}(t)$$

$$z(t)=i_{panel}(t)$$

$$u=D\qquad\text{Equation 10}$$

Figure 2:
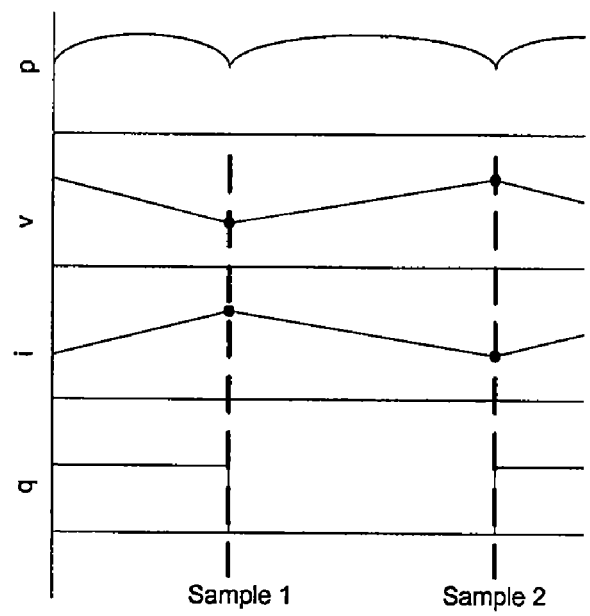
FIG. 2 illustrates graphs of a current and a voltage with sampling times taken when a derivative of the current changes signs consistent with the present invention.

In the boost converter 12, $\dot{z}=di_{panel}/dt=q$, where q is a command to the gate of the controlled switch. With these definitions, FIG. 2 shows the sample timing. A microcontroller is used to generate q with uniform PWM. Conventional sensors 28 and 30 detect $i_{panel}(t)$ and $v_{panel}(t)$, then an analog-to-digital converter (ADC) (not shown) synchronized to a PWM process samples the sensor outputs at the two edges of q. The duty cycle is computed as:

$$D(T^+)=D(T^-)+k\,\mathrm{sgn}(P_{panel}(DT)-P_{panel}(0))\qquad\text{Equation 11}$$

Figure 9:
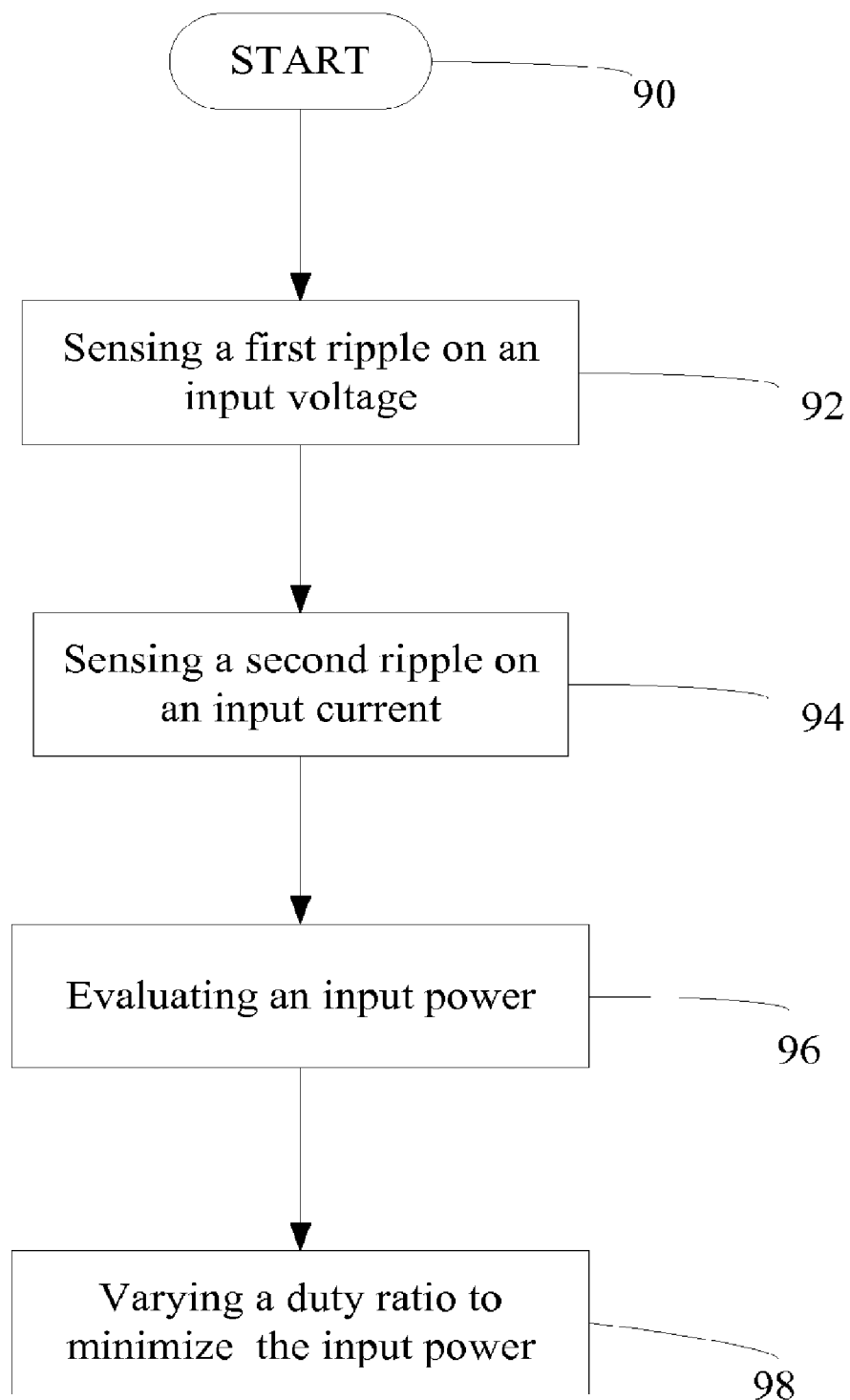
FIG. 9 is a flow diagram illustrating a method for minimizing an input power based on detected ripples of both a voltage and a current consistent with the present invention.

As such, computation of the new duty cycle value requires two multiplications, a comparison, and an addition, which are simple computations suitable for a low-end microcontroller such as an MSP430F147 from Texas Instruments or an AT90PWM2 from Atmel. The computation of the duty cycle is illustrated by Steps 90-98 of FIG. 9.

Figure 3:
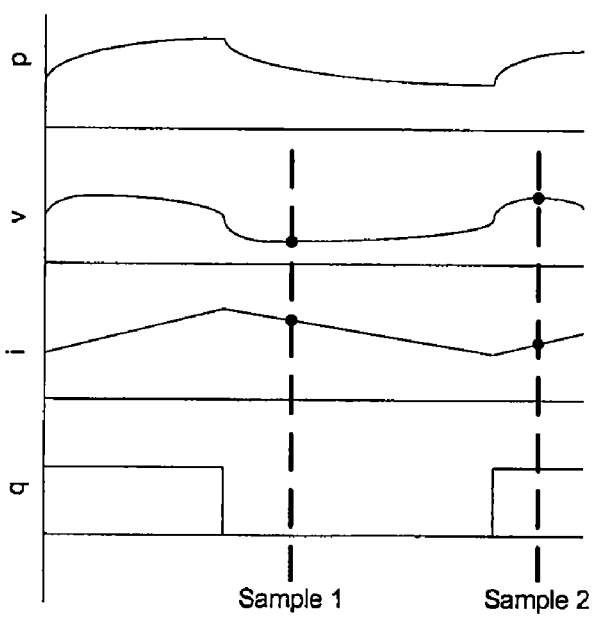
FIG. 3 illustrates graphs of a current and a voltage with sampling times taken when a derivative of the voltage changes sign consistent with the present invention.

All solar panels have capacitance that results from stored charge at the p-n junctions. Known results have proved that choosing $z(t)=v_{panel}(t)$ greatly reduces the effect of panel capacitance on the correlator compared to the choice $z(t)=i_{panel}(t)$. The designer may choose to compare the derivative of $v_{panel}(t)$ to zero with an analog circuit to sample precisely when z changes sign. An alternative is to estimate the phase delay between the gate command and the voltage extremes, which occur when z changes sign. An example is shown in FIG. 3. The time-based approach enhances noise immunity, since the extremes of the voltage ripple can be quite rounded while the switching edges are known exactly. The amount of delay varies with the panel time constant (incremental resistance multiplied by small-signal capacitance).

To find the sampling times shown in FIG. 3, the differential equation governing the energy source current and voltage can be solved explicitly. By neglecting dc components, the inductor current is an asymmetric triangle wave. The energy source unit 10 can be modeled as a resistance $$R=-\frac{\partial V}{\partial I}$$

Figure 4:
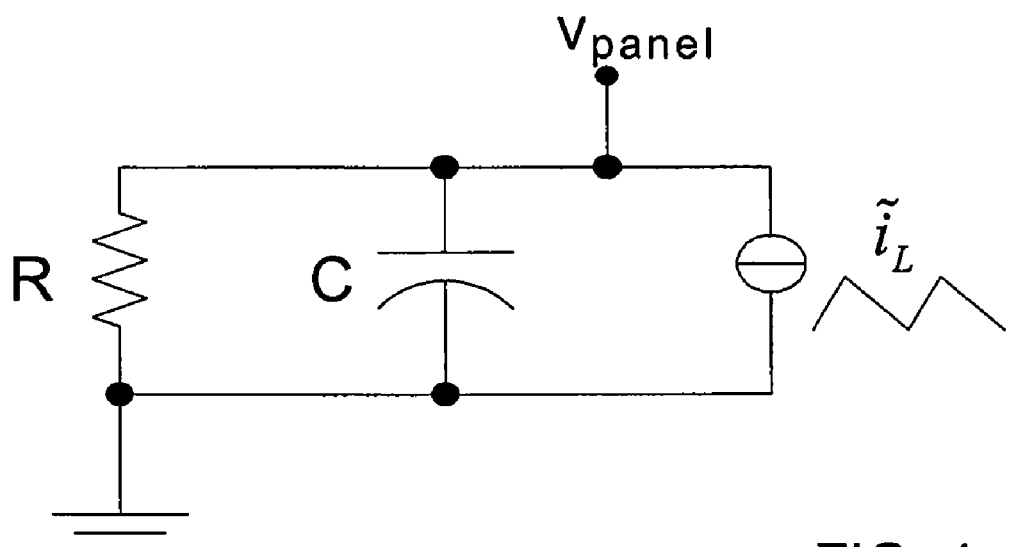
FIG. 4 is a schematic diagram illustrating a small-signal equivalent circuit consistent with the present invention.

40 in parallel with a capacitance C 42 related to stored charge at the pn junction, as shown in FIG. 4 for a small-signal equivalent circuit. The differential equations can be solved to find $v_{panel}(t)$. The correct sampling times occur when $$\frac{dv_{panel}}{dt}(t_{sample})=0,$$

which can be solved directly:

$$t_{sample}=DT+RC\ln\left(\frac{1-\exp\!\left(\frac{(1-D)T}{RC}\right)}{(1-D)\!\left(1-\exp\!\left(\frac{T}{RC}\right)\right)}\right)\qquad\text{Equation 12}$$

Figure 5:
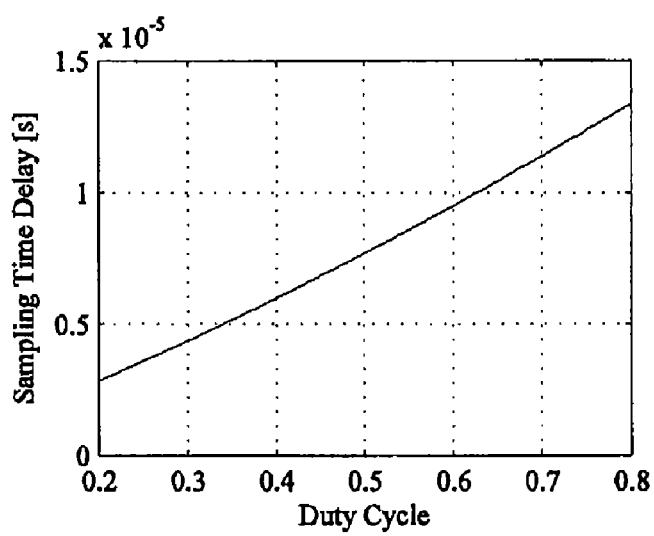
FIG. 5 is a graph illustrating variations of sampling delay times with duty cycle for a solar panel consistent with the present invention.

The sampling time is a function of duty cycle, shown in FIG. 5, which may be substantially complicated to be evaluated by a low-cost microcontroller. However, a quadratic function or a pair of straight lines can fit the true function within 2%. For simplicity of implementation, the straight line approximation was used in the experimental results discussed below.

DRCC can work well as long as there is enough ripple to produce unambiguous measurements based on Equation 11 with a limited-resolution ADC. For a solar panel, that translates into ensuring that the actual panel voltage is somewhat below the panel open-circuit voltage, but not so far below that the current approaches the panel short-circuit current. Based on this observation, mode switching can be employed to ensure stability and to limit the operating range to a point near an expected global optimum. Enforcement of simple voltage limits could work over a limited range of insulation and temperature. A better approach is to use a modified constant-voltage-fraction (CVF) approach as the basis for voltage limits. This CVF approach was developed in J. Schoeman and J. D. van Wyk, "A simplified maximal power controller for terrestrial photovoltaic panel arrays," in *Rec. Power Electronics Specialists Conference,* 1982, pp. 361-367.

The CVF method is based on the observation that regardless of operating conditions, the voltage that corresponds to a silicon solar panel's maximum power point is about 0.70 to 0.75 times the panel open-circuit voltage. A tracking effectiveness γ is defined to be the ratio of actual power delivered to the maximum power available. Then the CVF method typically achieves a tracking effectiveness between 90% and 95%, while nearly perfect tracking effectiveness can be expected from RCC or DRCC. Mode switching is an approach that uses CVF and DRCC together, as follows:

1. Turn the converter off for some time short $T_1$. This time $T_1$ needs to be sufficient for panel current to go to zero and panel voltage to reach the open-circuit voltage. About 1 ms is usually adequate.
2. Sample the open-circuit voltage $V_{oc}$. Determine a voltage set point $V_{cvf}=k_{cvf}V_{oc}$. Enable switching with some reasonable duty cycle. Use a conventional feedback controller to drive $v_{panel}(t)$ to $V_{cvf}$.

3. After some time $T_2$, switch from CVF mode to DRCC mode. Enforce voltage limits $V_{min}=k_{min}V_{oc}$ and $V_{max}=k_{max}V_{oc}$, with values $k_{min}$ and $k_{max}$ slightly below and above the estimated fraction $k_{cvf}$. This will keep the panel near the global maximum. Calculate a new duty cycle in every subsequent period based on Equation 11 and subject to the limits.

4. After some time $T_3$, repeat the entire sequence.

Figure 10:
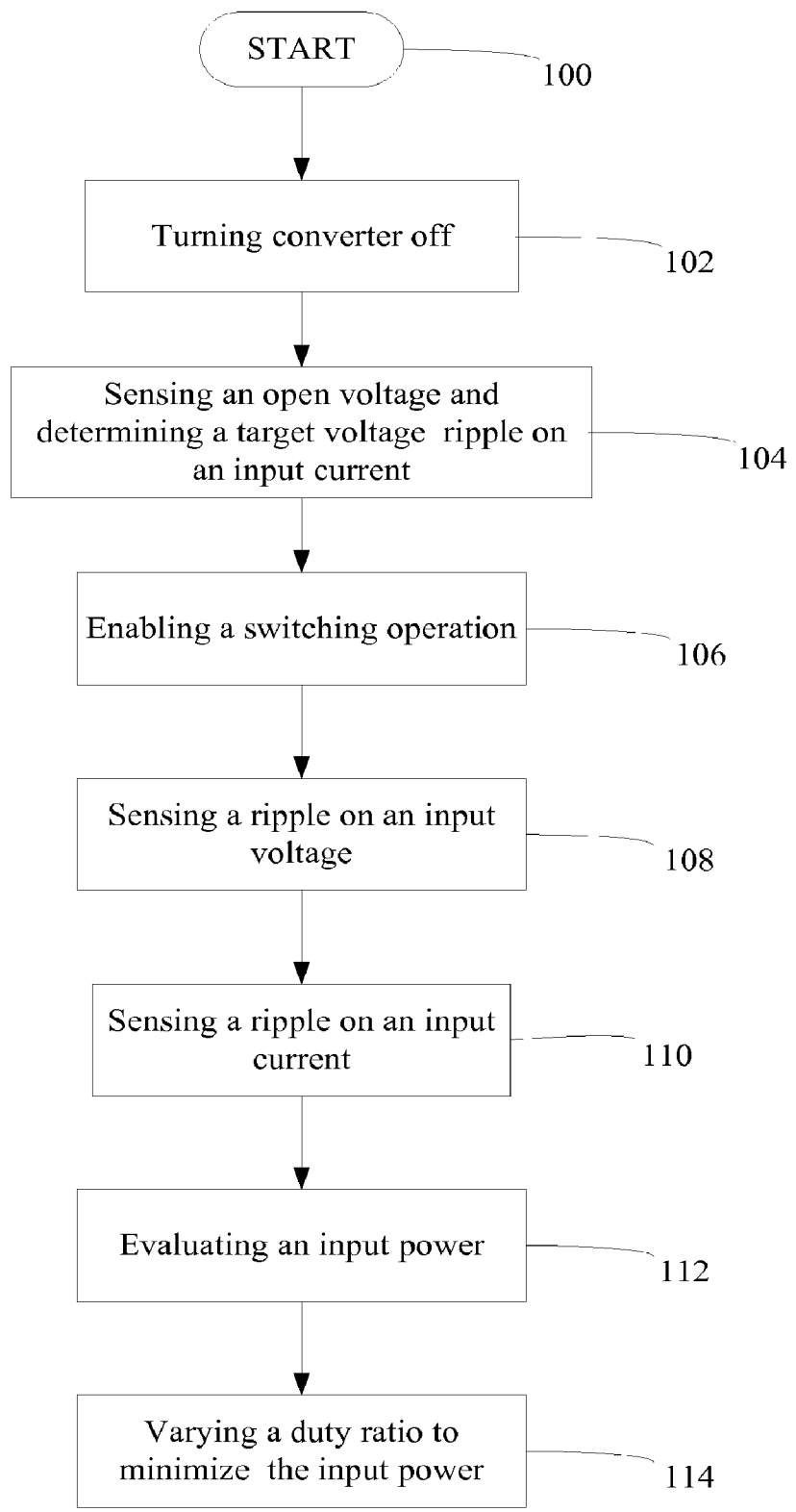
FIG. 10 is a flow diagram illustrating a method for minimizing an input power based on open-circuit voltages and on detected ripples of both a voltage and a current consistent with the present invention.

The above enumerated steps of the mode switching approach are illustrated by Steps 100-114 of FIG. 10.

The CVF technique is well established and robust. In the sequence described here, CVF is used in a supervisory fashion to prevent the system from running too close to open- or short-circuit conditions, in which the ripple provides little useful information. Other supervisory methods, such as a fixed limiting voltage range, can also be used.

To derive the maximum benefit from DRCC, the designer should set $T_1 \ll T_2 \ll T_3$. During $T_1$, no power is derived from the panel or energy source unit 10, but $T_1$ must be long compared to the panel time constant. During $T_2$, the energy source unit 10 is producing near the maximum power point, but perhaps only 90% or 95% ($\gamma_{cvf}$) of the available power is extracted. During $T_3$, upwards of 99% ($\gamma_{rcc}$) of the available power is delivered to the load 14. The average tracking effectiveness is:

$$\gamma_{ave} = \frac{\gamma_{cvf} T_2 + \gamma_{rcc} T_3}{T_1 + T_2 + T_3} \qquad (1)$$

The total tracking effectiveness is less than 100% with mode switching, although it is more than 99% if $T_3 > 100 T_2$. This tracking effectiveness is much higher than with CVF alone and avoids the local extremum challenge of prior RCC implementations.

An example of the MPPT 18 incorporating the DRCC controller 20 was built to verify the DRCC technique. The solar panel or energy source unit 10 has a total area of 0.5 m² comprising 18 cells in series, for an open-circuit voltage of 12 V and a short-circuit current of 7.5 A. The source converter 12 controlled with MPPT 18 uses a boost topology. The inductor 22 is 5 mH, built on a high-flux toroid core. The controlled switch 26 is a FDR6580 MOSFET from Fairchild Semiconductor; the Schottky diode 24 is a S15L45C from STMicroelectronics.

Lower power techniques were used throughout the design to accommodate minimum insulation. The main controller is an MSP430F148 from Texas Instruments (TI). Unused peripherals are disabled. Where high speed operational amplifiers (op amps) are needed, the LM6142 from TI is used. Where low speed op amps are needed, the OPA4348 from TI is used instead to reduce quiescent current. Outputs from the microcontroller, synchronized to but delayed from the PWM waveform, drive 74AHC4066 analog switches in a sample-and-hold circuit to sample panel voltage and current according to FIG. 3.

Aspects of methods, systems, and articles of manufacture consistent with the present invention have been depicted as involving a controller, including at least one processor, performing instructions stored in a memory. Moreover, one having skill in the art will appreciate that these aspects may be stored on or read from other computer-readable media, such as computer-readable storage media such as secondary storage devices, like hard disks, floppy disks, and CD-ROM or other forms of ROM or RAM either currently known or later developed. Further, although specific components of the controller are described herein, one having skill in the art will appreciate that a controller suitable for use with methods, systems, and articles of manufacture consistent with the present invention may contain additional or different components.

Figure 6:
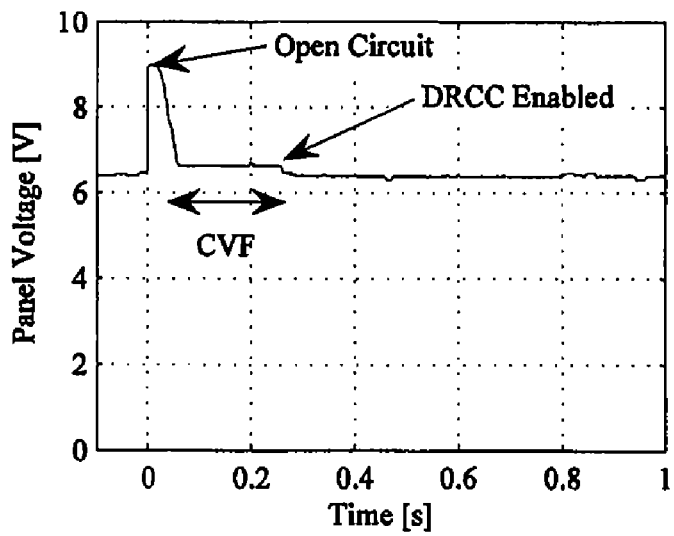
FIG. 6 is a graph illustrating solar panel voltages when illuminated with fluorescent lights through three operating modes consistent with the present invention.
Figure 7:
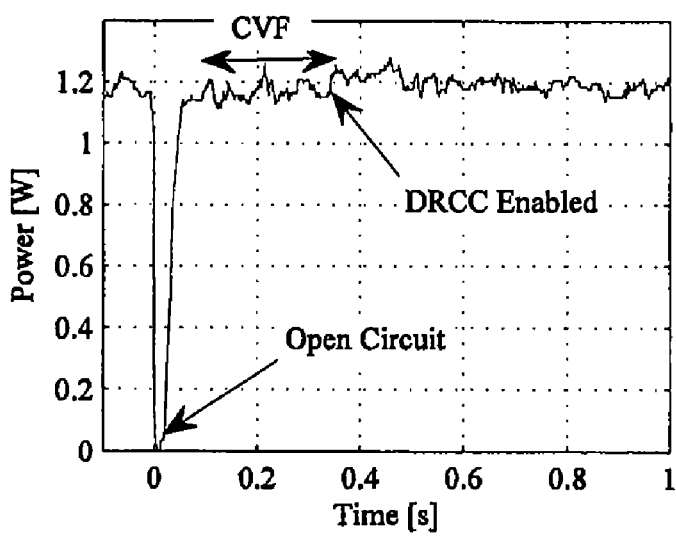
FIG. 7 is a graph illustrating computed solar panel powers corresponding to the panel voltages of FIG. 6 consistent with the present invention.

This exemplary embodiment of the MPPT 18 was designed for a remote unattended power source. In general, if the insulation is high, ample power is available and tracking effectiveness is less critical. A key to success is extracting maximum power at low insulation. This was tested with the energy source unit or panel 10 under a fluorescent light fixture. Panel voltage is shown in FIG. 6 and computed panel power is shown in FIG. 7. First, the panel 10 goes to its open circuit voltage $V_{oc}$, which varies with temperature and insulation. Next, the CVF controller (not shown) is enabled. The duty cycle increments until the panel reaches $k_{cvf}V_{oc}$ in about 60 ms. Finally, the DRCC controller 20 is enabled to find the exact optimum. Since $k_{vcf}V_{oc}$ is near the maximum power point already, convergence of the DRCC controller 20 takes place in only 30 ms. Noise in the oscilloscope current measurement affects the offline computed power, but still, a 3% power increase can be measured between CVF and DRCC operation.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

The invention clamed is:

1. A method for controlling a variable of a switching electrical circuit, comprising the steps of:
   (a) detecting values for each of a first waveform and of a second waveform in the switching circuit at a beginning of and at a predetermined instant during a switching interval of a switching operation of the electrical circuit, both of the first and second waveforms are perturbed by the switching operation;
   (b) evaluating the variable based on the corresponding values of both the first waveform and the second waveform detected at the beginning and at the predetermined instant during the switching interval; and
   (c) adjusting an operating point of the circuit based on a change in the variable between the two evaluations so as to minimize the change in the variable.

2. The method of claim 1, wherein the electrical circuit comprises a switching dc-dc converter.

3. The method of claim 2, wherein the first perturbed waveform is an input current of the converter.

4. The method of claim 3, wherein the predetermined instant is a switching instant of the switching operation of the electrical circuit.

5. The method of claim 2, wherein the second perturbed waveform is an input voltage of the converter.

6. The method of claim 5, wherein the predetermined instant is a switching instant of the switching operation of the electrical circuit augmented by a phase delay time.

7. The method of claim 2, wherein the variable to be controlled is a power input to the converter.

8. The method of claim 7, wherein the operating point is changed by varying a duty ratio of the converter.

9. The method of claim 2, wherein the operating point comprises an input voltage and an input current of the converter.

10. The method of claim 1, wherein the electrical circuit comprises an ac motor controller.

11. A controller for controlling a switching electrical circuit, comprising:
- a first unit for detecting values of a first waveform perturbed by a switching operation of the electrical circuit at a beginning of and at a predetermined instant during a switching interval of the switching operation;
- a second unit for detecting values of a second waveform perturbed by the switching operation of the electrical circuit at the beginning of and at the predetermined instant during the switching interval;
- an evaluating unit coupled to the first and second units and operable to compute a variable to be controlled based on the corresponding values of both the first waveform and the second waveform detected at the beginning and at the predetermined instant during the switching interval; and
- an operating point generator coupled to the evaluating unit and to the electrical circuit and operable to change an operating point of the electrical circuit based upon a change in the variable between the two evaluations.

12. The controller of claim 11, wherein the electrical circuit comprises a switching dc-dc converter.

13. The controller of claim 12, wherein the first perturbed waveform is an input current of the converter.

14. The controller of claim 12, wherein the second perturbed waveform is an input voltage of the converter.

15. The controller of claim 12, wherein the variable to be controlled is a power input to the converter.

16. The controller of claim 12, wherein the operating point comprises an input voltage and an input current of the converter.

17. The controller of claim 16, wherein the operating point generator is operable to vary a duty ratio of the converter.

18. A method for controlling an input power to a switching dc-dc converter, comprising the steps of:
- (a) sensing a first ripple on an input voltage to the converter, the first ripple is produced by a switching operation of the converter, and detecting values of the input voltage at a beginning of and at a predetermined instant during a switching interval of the switching operation of the dc-dc converter;
- (b) sensing a second ripple on an input current to the converter, the second ripple is produced by the switching operation of the converter, and detecting values of the input current at the beginning of and at the predetermined instant during the switching interval;
- (c) evaluating the input power based on the corresponding values of both the input voltage and the input current detected at the beginning and at the predetermined instant during the switching interval; and
- (d) varying a duty ratio of the switching operation based on a change in the input power so as to maximize or minimize the input power.

19. A computer readable storage medium comprising instructions which when executed by a computer system causes the computer to implement a method for controlling a variable of a switching electrical circuit, comprising: a first unit for detecting values of a first waveform perturbed by a switching operation of the electrical circuit at a beginning of and at a predetermined instant during a switching interval of the switching operation;
- a second unit for detecting values of a second waveform perturbed by the switching operation of the electrical circuit at the beginning of and at the predetermined instant during the switching interval;
- an evaluating unit coupled to the first and second units and operable to compute the variable to be controlled based on the corresponding values of both the first waveform and the second waveform detected at the beginning and at the predetermined instant during the switching interval; and
- an operating point generator coupled to the evaluating unit and to the electrical circuit and operable to change an operating point of the electrical circuit based upon a change in the variable between the two evaluations.

20. A system for performing a method for controlling a variable of a switching electrical circuit, the system comprising:
- at least one processor programmed to detect values of a first waveform perturbed by a switching operation of the electrical circuit at a beginning of and at a predetermined instant during a switching interval of the switching operation;
- at least one processor programmed to detect values of a second waveform perturbed by the switching operation of the electrical circuit at the beginning of and at the predetermined instant during the switching interval;
- at least one processor programmed to compute the variable to be controlled based on the corresponding values of both the first waveform and the second waveform detected at the beginning and at the predetermined instant during the switching interval; and
- at least one processor programmed to change an operating point of the electrical circuit based upon a change in the variable between the two evaluations.

21. A method for controlling an input power to a switching dc-dc converter, comprising the steps of:
- turning the converter off for a first duration of time; sensing an open circuit voltage to the converter and determining a target voltage based on the sensed open circuit voltage;
- enabling a switching operation with a predetermined duty cycle and driving the input voltage of the controller to the target voltage;
- sensing a first ripple on the input voltage to the converter after a second duration of time, the first ripple is produced by the switching operation of the converter, and detecting values of the input voltage at a beginning of and at a predetermined instant during a switching interval of the switching operation of the electrical circuit;
- sensing a second ripple on an input current to the converter after the second duration of time, the second ripple is produced by the switching operation of the converter, and detecting values of the input current at the beginning of and at the predetermined instant during the switching interval;
- evaluating the input power based on the corresponding values of both the input voltage and the input current detected at the beginning and at the predetermined instant during the switching interval; and
- varying a duty ratio of the switching operation based on a change in the input power so as to minimize the change in the input power.

22. The method of claim 21, further comprising the step of: maintaining the input voltage between a upper limit voltage and a lower limit voltage, which are both determined based on the open circuit voltage.

23. The method of claim 21, further comprising the step of: repeating the steps of claim 1 after a third duration of time.

24. The method of claim 21, wherein the first duration of time is substantially greater than the second duration of time and the second duration of time is substantially greater than the third duration of time.

25. The method of claim 21, wherein the first duration of time is sufficient for the input current to become equal to zero and for the input voltage to reach the open circuit voltage.

* * * * *